(12) United States Patent
Kerman (10) Patent No.: US 12,393,748 B2
(45) Date of Patent: Aug. 19, 2025

(54) DISSIPATIVE, PHOTON-ASSISTED QUANTUM ANNEALING

(71) Applicant: Massachusetts Institute of Technology, Cambridge, MA (US)

(72) Inventor: Andrew J. Kerman, Arlington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 953 days.

(21) Appl. No.: 17/523,601

(22) Filed: Nov. 10, 2021

(65) Prior Publication Data
US 2022/0198100 A1 Jun. 23, 2022

Related U.S. Application Data

(60) Provisional application No. 63/128,436, filed on Dec. 21, 2020.

(51) Int. Cl.
| | |
|---|---|
| *G06F 30/20* | (2020.01) |
| *G06E 1/00* | (2006.01) |
| *G06N 10/00* | (2022.01) |
| *G06F 111/08* | (2020.01) |

(52) U.S. Cl.
CPC .............. *G06F 30/20* (2020.01); *G06E 1/00* (2013.01); *G06N 10/00* (2019.01); *G06F 2111/08* (2020.01)

(58) Field of Classification Search
CPC ..... G06F 30/20; G06F 2111/08; G06N 10/00; G06E 1/00
USPC ......................................................... 706/45
See application file for complete search history.

(56) References Cited

U.S. PATENT DOCUMENTS

| | | | |
|---|---|---|---|
| 10,295,582 B2 * | 5/2019 | Bishop | G01R 29/0892 |
| 10,735,003 B2 | 8/2020 | Kerman | |
| 2018/0365587 A1 * | 12/2018 | Barzegar | G06N 10/60 |

OTHER PUBLICATIONS

Spin wave based tunable switch between superconducting flux qubits, Yuan et al., Apr. 5, 2020 (Year: 2020).*
Hardware-efficient Variational Quantum Eigensolver for Small Molecules and Quantum Magnets, Kandala et al, 2017 (Year: 2017).*

(Continued)

*Primary Examiner* — Austin Hicks
(74) *Attorney, Agent, or Firm* — DALY, CROWLEY, MOFFORD & DURKEE, LLP (57) ABSTRACT

In accordance with dissipative, photon-assisted quantum annealing described herein, a collection of qubits model a Boolean optimization problem, and the solution is determined by quantum annealing. However, rather than drive the qubits using a quasi-static field transverse to the computational direction, spins are allowed to evolve between computational states by multi-photon, inelastic collective scattering into a common waveguide coupled transversely to all of the qubits. Transitions between arbitrary states are enabled by the continuum of modes of the waveguide, while avoiding the exponential sensitivity to low-frequency decoherence near small gaps which is inherent in conventional QA. Moreover, because the transverse coupling to the waveguide averages to zero, the spin of each qubit experiences a net field purely in the computational direction, allowing continuous, quantum non-demolition measurement of the system.

11 Claims, 4 Drawing Sheets

(56) References Cited

OTHER PUBLICATIONS

Selective quantum evolution of a qubit state due to continuous measurement, Physical Review B, vol. 63, 115403, Korotkov, 2001 (Year: 2001).*
Fang et al. EPJ Quantum Technology 2014, 1:3 http://www.epjquantumtechnology.com/content/1/1/3 (Year: 2014).*
Introduction to spin wave computing, Mahmoud et al, Cite as: J. Appl. Phys. 128, 161101 (2020); (Year: 2020).*
Photonic quantum information processing: A concise review, Slussarenko et al, Appl. Phys. Rev. 6, 041303 (2019) https://doi.org/10.1063/1.5115814 (Year: 2019).*
Jordan, et al.; "Perturbative Gadgets at Arbitrary Orders;" The American Physical Society; Physical Review A 77, 062329 (2008); Jun. 19, 2008; 8 pages.
Kerman; "Superconducting Qubit Circuit Emulation of a Vector Spin—1/2;" New Journal of Physics 21, 073030 (2019); Jul. 18, 2019; 26 pages.
Ozfidan, et al.; "Demonstration of a Nonstoquastic Hamiltonian in Coupled Superconducting Flux Qubits," Physical Review Applied 13, 034037 (2020); Mar. 16, 2020; 15 pages.
Schondorf, et al.; "Nonpairwise Interactions Induced by Virtual Transitions in Four Coupled Artificial Atoms," Physical Review Applied 12, 064026 (2019); Dec. 10, 2019; 19 pages.

\* cited by examiner

DISSIPATIVE, PHOTON-ASSISTED QUANTUM ANNEALING

CROSS-REFERENCE TO RELATED APPLICATION

This application claims the benefit of U.S. Provisional Application No. 63/128,436, filed Dec. 21, 2020, the entire contents of which are incorporated herein by reference.

STATEMENT REGARDING FEDERALLY SPONSORED RESEARCH

This invention was made with government support under FA8702-15-D-0001 awarded by the U.S. Air Force. The government has certain rights in the invention.

FIELD

This disclosure pertains generally to quantum computing, and more particularly to solving Boolean optimization problems using quantum annealing.

BACKGROUND

Pseudo-Boolean functions are functions that assign values (i.e. real numbers) to n-bit words, and Boolean optimization is the task of maximizing (or minimizing) the values of such functions over all input words. Beginning around 2010, there was an explosion of research and development in Boolean optimization methods for "classical" problems whose input words are built from bits having discrete zero-or-one states, but using quantum hardware—hardware that uses quantum bits, or "qubits", having a continuum of states. There are now a wide array of different technologies that attempt to provide hardware-efficient methods for classical Boolean optimization. The original focus of these methods, like transverse-field quantum annealing ("TFQA"), was providing an explicit role for quantum fluctuations, and the results were valued largely based on the promise of explicit quantum advantage over classical computers.

In general, annealing methods are applied to classical optimization problems by mapping a classical problem's cost function to the energy of a real or fictitious classical Ising spin system, in which each spin (in the simplest case) maps to a Boolean variable, and the problem is encoded in the values of magnetic couplings between spins and the local magnetic fields applied to the spins. The optimization problem is then mapped to the problem of minimizing the energy of the spin system. For the hard classical optimization problems of practical interest, the resulting energy landscape that must be searched for low-energy (and therefore low-cost) solutions is very "glassy," meaning that it has a large number of disconnected local minima. This means that search strategies which only explore locally about a given point tend not to perform well.

Classical simulated annealing is such a strategy. Here, the search is carried out using classical (typically thermal) fluctuations. Starting from a high temperature (i.e. strong random fluctuations of the spins which sample all possible configurations equally), the system is slowly cooled until it "crystallizes" into a single final state, which corresponds to the output.

By contrast, in conventional quantum annealing ("QA") these classical fluctuations are replaced by "quantum fluctuations," in the form of an additional Hamiltonian known as the "driver," which does not commute with that of the classical problem, and therefore induces quantum fluctuations or dynamics which couple the different classical states. In essentially all experimental realizations to date, the driver consists of an effective magnetic field in the direction transverse to the computational axis (the direction along which the local fields and magnetic couplings defining the classical problem are aligned). The resulting spin precession around the transverse field then corresponds to a coupling between classical configurations, producing what are often called "quantum fluctuations" between these configurations. In a manner qualitatively similar to simulated annealing, the protocol starts with a very strong driver, which is then slowly reduced (a process known as the "annealing schedule") until only the classical problem remains, and the output can be read off by simply measuring the classical state of each spin. Importantly, this all takes place at the lowest possible temperature permitted by available hardware. Also analogous to classical annealing, the system starts spread out equally over all possible configurations, corresponding to a ground state in which every spin is aligned with the transverse field, and therefore in an equal superposition of the up and down states. If the procedure works perfectly, the system evolves adiabatically, remaining in its ground state as the annealing schedule proceeds, until it eventually reaches the ground state of the classical problem, corresponding to the global optimum.

The prospects for quantum advantage in this process are centered on specific points in the annealing schedule, in which the ground state has avoided crossings with other states, since it is predominantly at these points that the system can leave the ground state. In hard classical optimization problems of practical interest, it is believed to be the case quite generally that one or more of these avoided level crossings will have an energy splitting that decreases exponentially with the number of spins (denoted "N") in the system. This arises from the fact that the two crossing states differ by a number of spin flips that increases polynomially with N. If quantum annealing is to provide a strong scaling advantage over classical annealing, one must find a way to keep the system in the ground state as it crosses this small gap, with a probability that is not exponentially small.

There are a number of reasons why keeping the system in the ground state at these small gaps is extremely difficult. First, one can never know in advance where these small gaps will occur in the schedule without having already solved the problem, so one cannot preferentially slow the schedule down in the right places. This means that a generic annealing schedule will be overwhelmingly likely to traverse critical crossings too quickly, such that the system transitions to the excited. However, since the tunneling is no longer resonant after the crossing, the system will tend to be trapped in this (now metastable) excited state, whose energy gap will continue to increase as the schedule proceeds, getting farther and farther from the ground state. This excited state will then exhibit additional crossings with other excited states at which this process can be repeated, spreading probability out among a potentially large number of excited configurations. All that is known to do to avoid this problem is to anneal many times, each as slowly as possible, and look for the best outcome at the end. Unfortunately, since there are an exponential number of possible metastable solutions, one can never assess in sub-exponential time how far from optimal a given output is.

Second, the very reason that traversing these small gaps provides a mechanism for quantum advantage is the same reason that they couple extremely unfavorably to low-frequency decoherence. Each of these crossings can be viewed as a point at which multi-spin tunneling is resonant; that is, two states separated by a large energy barrier are degenerate at each of these points, and the very small gap between levels as they cross is an avoided crossing due to tunnel coupling through the barrier. By passing through this tunneling resonance in the schedule, the system effectively turns on a weak many-spin fluctuation process by which it passes through a classically insurmountable barrier: the essence of quantum annealing's presumed advantage. However, this tunneling resonance also allows low-frequency, local noise, which ordinarily would have little effect on multi-spin processes, to couple parametrically and resonantly to them. The net result is that, while the resonance provides a way to access multi-spin tunneling in the absence of physical nonlocal interactions, this mechanism is exquisitely sensitive to local, low-frequency noise. Prior art quantum annealing machines exhibit very limited quantum behavior for just this reason.

Another problem is that by adding a quasi-static, transverse "X" field, the local field seen by each spin (i.e. the sum of the field applied to it plus all of the fields from other spins to which it is coupled magnetically) is no longer along the direction associated with the computational "Z" basis. This has two important consequences. First, noise causes transitions between local spin states, and is therefore very effective at producing decoherence. This is because the primary noise source can be viewed as local field noise in the computational direction, which is not parallel to the total field seen by each spin due to the presence of the transverse field except at the very end of the annealing schedule, when the transverse field is zero. Second, most possibilities for continuous quantum monitoring and feedback are precluded because the direction of the total, driven field is unknown, so there is no way to measure the spin, even weakly, without disrupting its state, i.e. there is no way to make a quantum non-demolition ("QND") measurement.

These disadvantages of known quantum annealing techniques can be summarized as follows. First, computational power is focused on exponentially narrow gap regions where weak multi-spin tunneling can occur, whose locations in the annealing schedule are unknown.

Second, the many-spin tunneling processes which underpin quantum advantage are enabled only by bringing them into resonance, when (i) the barriers are extremely high and/or wide, making these processes exponentially weak; and (ii) they occur at very low frequencies, allowing them to be strongly disrupted by low-frequency decoherence.

Third, the purported mechanism for quantum enhanced performance is premised on the idea of staying always in the ground state during the schedule, and very little is even conjectured about what if any benefit remains if this assumption is violated, even though it very likely will be for application-scale problems. This assumption makes known techniques extremely ill-suited to the vast majority of optimization problems where the ground state is not uniquely significant as an answer beyond the value of its energy.

Fourth, adiabatic, ground-state evolution through exponentially small gaps requires fully-coherent, unitary dynamics—just like in the gate model of quantum computation—but unlike in that model, there is no known method for quantum annealing to achieve fault-tolerance in the presence of decoherence.

Fifth, because of the requirement for a quasi-static, non-commuting driver Hamiltonian, the vector axis of the total quasi-static field seen by each spin (typically in the Z-X plane) is unknown, different for each spin, and is in fact entangled with the states of other spins. This means that the dominant source of decoherence (local Z noise) naturally induces incoherent transitions between configurations, and also precludes any possibility of weak quantum non-demolition measurement during annealing.

And sixth, advanced hardware which aims to enhance computational power of conventional QA by using non-stoquastic Hamiltonians and/or stronger multi-spin fluctuations relies on new and complex circuits that exploit both electric and magnetic couplings, create sensitivity to electric noise, and/or involve new kinds of couplers to produce static multi-spin interactions.

SUMMARY OF DISCLOSED EMBODIMENTS

Disclosed embodiments of the concepts, techniques, and structures disclosed herein concern a new method for harnessing explicit quantum fluctuations for classical optimization: dissipative, photon-assisted quantum annealing ("DPA-QA"). Unlike conventional quantum annealing which uses a quasi-static, non-commuting driver Hamiltonian that is slowly lowered according to an annealing schedule, embodiments do not add any quasi-static terms to the computational, Ising problem Hamiltonian. Instead, embodiments couple all spins to the delocalized propagating modes of a single quantum waveguide, which is then pumped coherently at one or more frequencies that are of the order of the local spin-flip energies for the Ising problem. Furthermore, the system explicitly allows spontaneous, inelastic scattering of the pump photons, placing an engineered dissipation channel at the center of the scheme.

Embodiments advantageously may have qualitatively better performance than existing QA systems. Embodiments may have stronger, longer-range quantum coupling between classical configurations differing by many spin flips, the primary conjectured quantum resource for enhancement of optimization performance. Embodiments may have strongly reduced quantum sensitivity to low-frequency noise. Embodiments may have potentially much simpler hardware and control requirements for the non-classical (i.e. quantum) parts of the system. Embodiments may have more direct connection throughout the protocol with the classical configuration space being searched. Embodiments may explicitly harness engineered dissipation to improve performance, as opposed to struggling to suppress it. And embodiments may have a static Hamiltonian that at all times commutes with measurement in the computational basis, allowing weak, continuous quantum non-demolition (QND) monitoring.

Thus, a first embodiment is a system for performing quantum annealing to solve an optimization problem. The system includes a plurality of qubits, each qubit in the plurality having an effective spin, wherein the spins of the plurality of qubits in a computational direction collectively encode the optimization problem. The system also includes a waveguide coupling a transverse spin component of each qubit in the plurality of qubits, allowing spontaneous photon emission from the qubit into the waveguide. And the system has an optical pump for pumping the waveguide according to a frequency.

In some embodiments, the optical pump is configured to pump the common waveguide coherently.

In some embodiments, the optical pump is configured to pump the common waveguide with drive photons, each drive photon having an energy that is an average local Zeeman energy of the spin of a qubit in the plurality of qubits.

In some embodiments, a first qubit in the plurality of qubits and a second qubit in the plurality of qubits are physically separated by an integer multiple of wavelengths of photons pumped by the optical pump according to the frequency.

In some embodiments, a qubit in the plurality of qubits is coupled to two different locations on the waveguide.

In some embodiments, there is also a sensor for performing a quantum non-demolition measurement in the computational basis of one or more of the qubits in the plurality.

In some embodiments, the sensor is configured for continuous measurement in the computational basis.

Another embodiment is a method of performing quantum annealing to solve an optimization problem. The method includes a first step of providing a plurality of qubits, each qubit in the plurality having a spin that is coupled in a transverse direction to a magnetic field provided by a waveguide. The method has a second step of resetting components of the spins of the plurality of qubits in a computational direction to a trial state. The method proceeds to a third step of allowing the plurality of qubits to evolve via dissipative photon emission into the waveguide while energy of the qubits is decreasing. When the energy of the qubits has stopped decreasing but has not reached a global minimum, the method returns to the second step of resetting the computational components to the trial state. But when the energy of the qubits has reached the global minimum, the method concludes that the components of the qubit spins in the computational direction encode a solution to the optimization problem.

In some embodiments, the method includes pumping the waveguide by an optical pump according to a frequency.

In some embodiments, pumping the waveguide comprises pumping with drive photons, each drive photon having an energy that is an average local Zeeman energy of the spin of a qubit in the plurality of qubits.

In some embodiments, the method also includes performing continuous, quantum non-demolition measuring in the computational basis of one or more of the plurality of qubits.

It is appreciated that the concepts, techniques, and structures disclosed herein may be embodied in other ways not listed above, and that this summary of embodiments should be viewed as illustrative rather than limiting.

DESCRIPTION OF THE SEVERAL VIEWS OF THE DRAWINGS

The manner and process of making and using the disclosed embodiments may be appreciated by reference to the drawings, in which.

DETAILED DESCRIPTION OF EMBODIMENTS

The main insight behind DPA-QA is that irreversible (i.e. dissipative) tunneling, between metastable (i.e. local) minima of the energy landscape during an annealing schedule, can be mediated by inelastic, multiphoton scattering of a common pump mode to which all qubits are coupled coherently. One essential element of this insight is that strongly allowed, local spin-flip transitions (staying within a given potential well in the landscape) couple to the continuum of radiation modes supported by the waveguide. This is the ingredient by which the multiphoton scattering becomes inelastic, and therefore irreversible. It is also the key feature which allows the tunneling effect to be broadband, independent of the particular energy splitting between any two local minima: the photon emitted spontaneously into the waveguide can take up whatever energy defect it needs to, such that the overall inelastic process conserves total energy.

Figure 1:
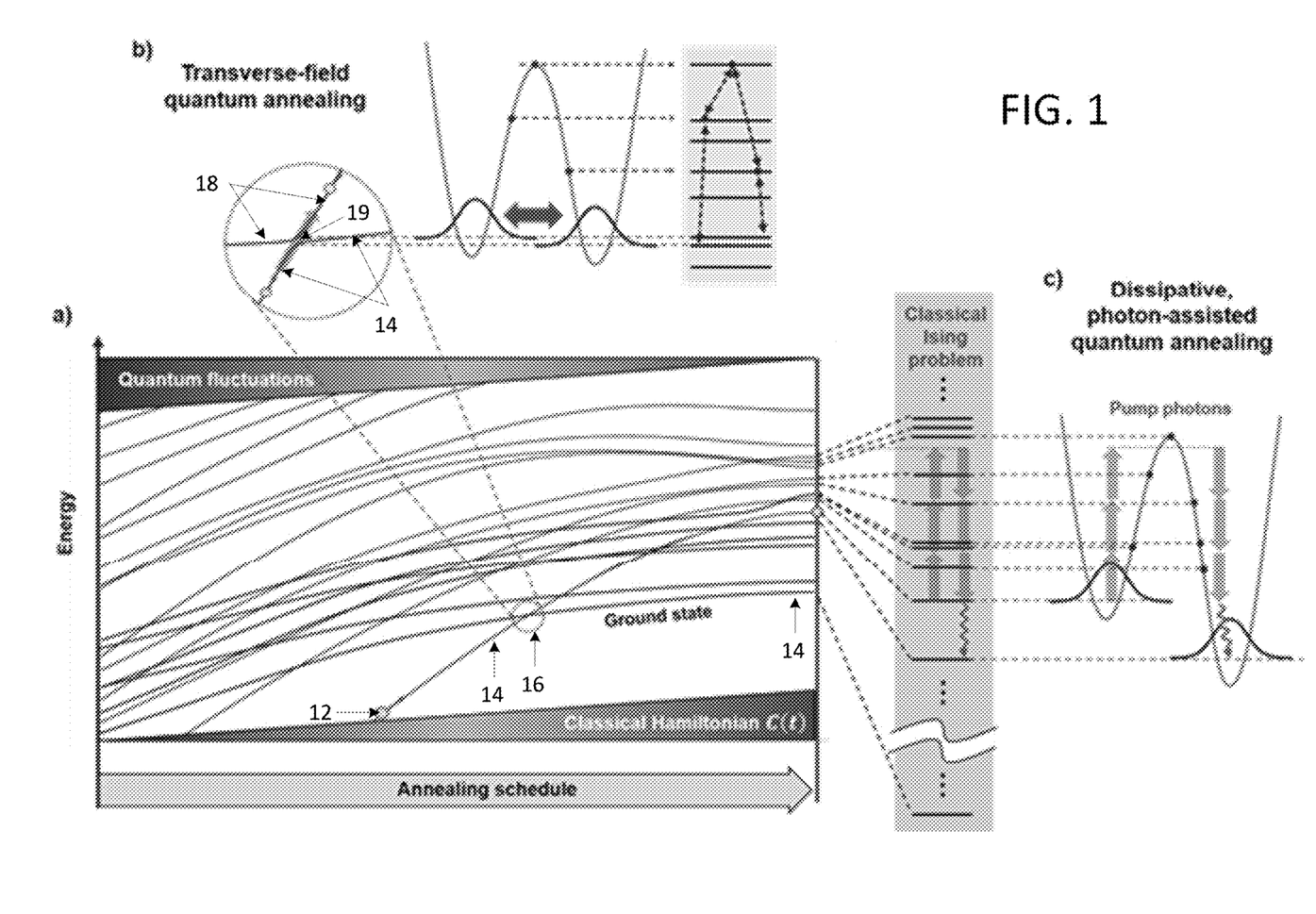
FIG. 1 schematically shows a comparison between conventional, transverse-field quantum annealing (TFQA) and dissipative, photon-assisted quantum annealing (DPA-QA) according to an embodiment of the concepts, techniques, and structures disclosed herein.

FIGS. 1(a)-1(c) (collectively "FIG. 1") schematically show a comparison between transverse-field quantum annealing ("TFQA") according to the prior art, and dissipative, photon-assisted quantum annealing ("DPA-QA") according to an embodiment. In TFQA, a quasi-static transverse field, which is applied to every spin, is slowly turned down according to an annealing schedule, shown in FIG. 1(a), until only the classical Hamiltonian remains. FIG. 1(a) shows the various quantum states in which the system may be during the annealing schedule, as the system transitions from being driven by the initially-strong, transverse Hamiltonian (at left), to being undriven and having classical energy levels (at right). An example system energy, as determined by the various qubits, is shown as state 12, which evolves by following the various allowed energy level curves to the right as the schedule proceeds. At the end of the schedule, the state 12 will be in one of the classical levels on the very right. To solve the Boolean optimization problem, one desires that the qubits are in a configuration that has an energy as low as possible (with the most valuable solution being the global minimum, i.e. the "Ground state" 14). Thus, it is necessary that the state 12 follow the correct energy level curve when those curves approach, with as high a probability as possible, such as at intersection 16 between the ground state 14 and the first excited state 18.

FIG. 1(b) illustrates how the computational power of TFQA arises at exponentially-small gaps between the ground state 14 and first excited state 18, corresponding to weak, high-order tunneling between the two states which differ by many spin flips. Two nearly-resonant states close to the narrow crossing point 19 can be viewed as two local minima in configuration space separated by a large energy barrier. Traversing this barrier requires flipping a number of spins that scales with the system size.

Since the transverse field driver corresponds to each spin fluctuating independently, the collective tunneling process between minima is suppressed exponentially in the number of spin flips separating them, and therefore in the size of the system. This also indicates the origin of the extreme sensitivity of this resonant tunneling process to low-frequency decoherence, which can be viewed as a dissipative environment that is constantly making independent, classical measurements of each spin. In order for a coherent tunneling trajectory between minima to occur, not a single one of the spins which need to flip can experience such a "measurement" during the exponentially-slow tunneling process.

FIG. 1(c) illustrates the different approach taken by DPA-QA according to an embodiment. In this embodiment, the static Ising Hamiltonian is instead supplemented by a common, distributed, high-frequency photon mode coupled to all spins in the system, and driven externally. The energy of these drive photons is chosen to be similar to the average local Zeeman energy of individual spins, such that virtual photon absorption/emission processes can flip spins without large energy defects. Now, the qubits are driven not by a transverse Hamiltonian, but by photons having a continuum of energies that mediate dissipative transitions from higher-energy states to lower-energy ones via inelastic scattering.

Figure 2:
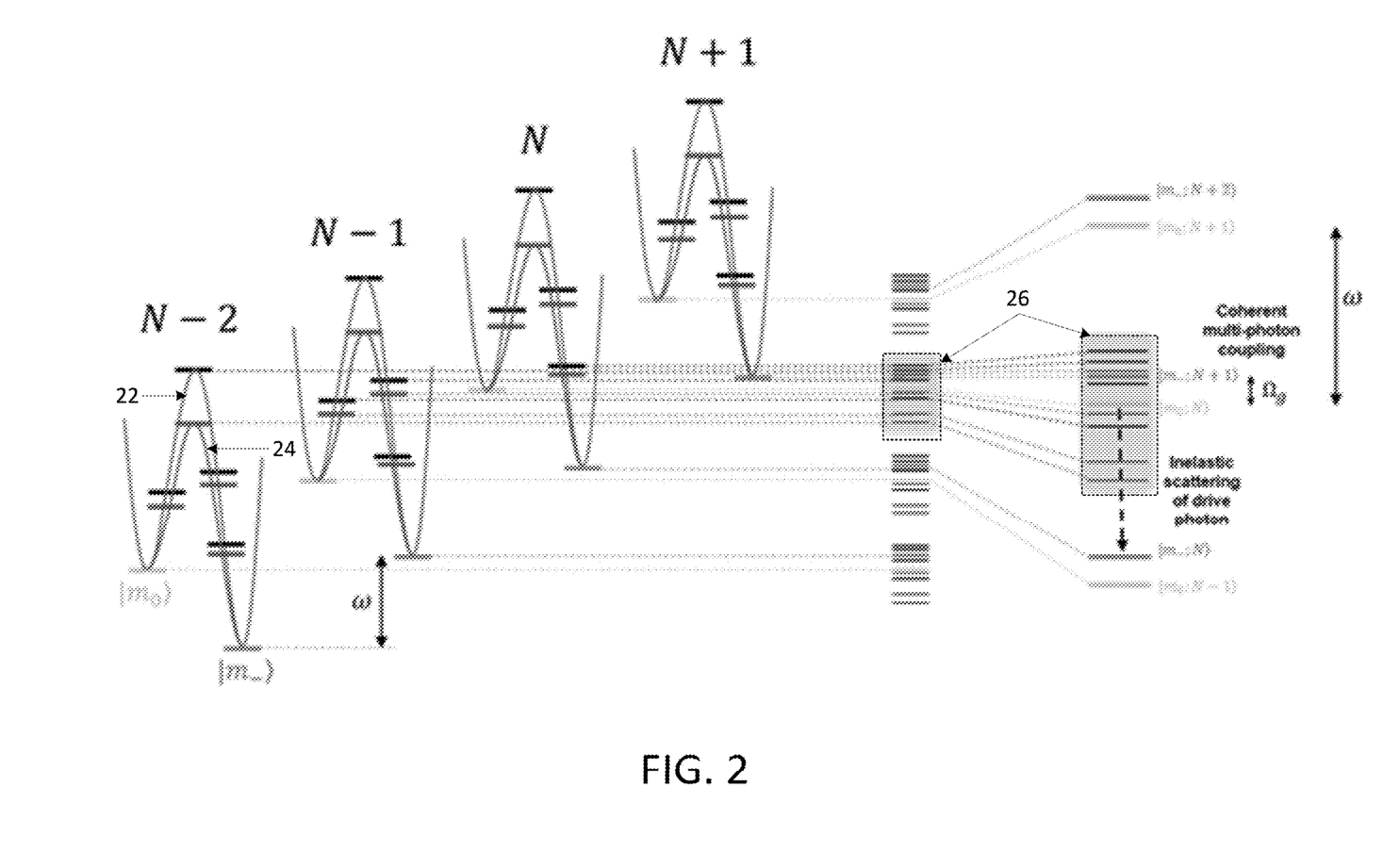
FIG. 2 schematically shows a dressed-state picture of tunneling in DPA-QA.
Figure 3:
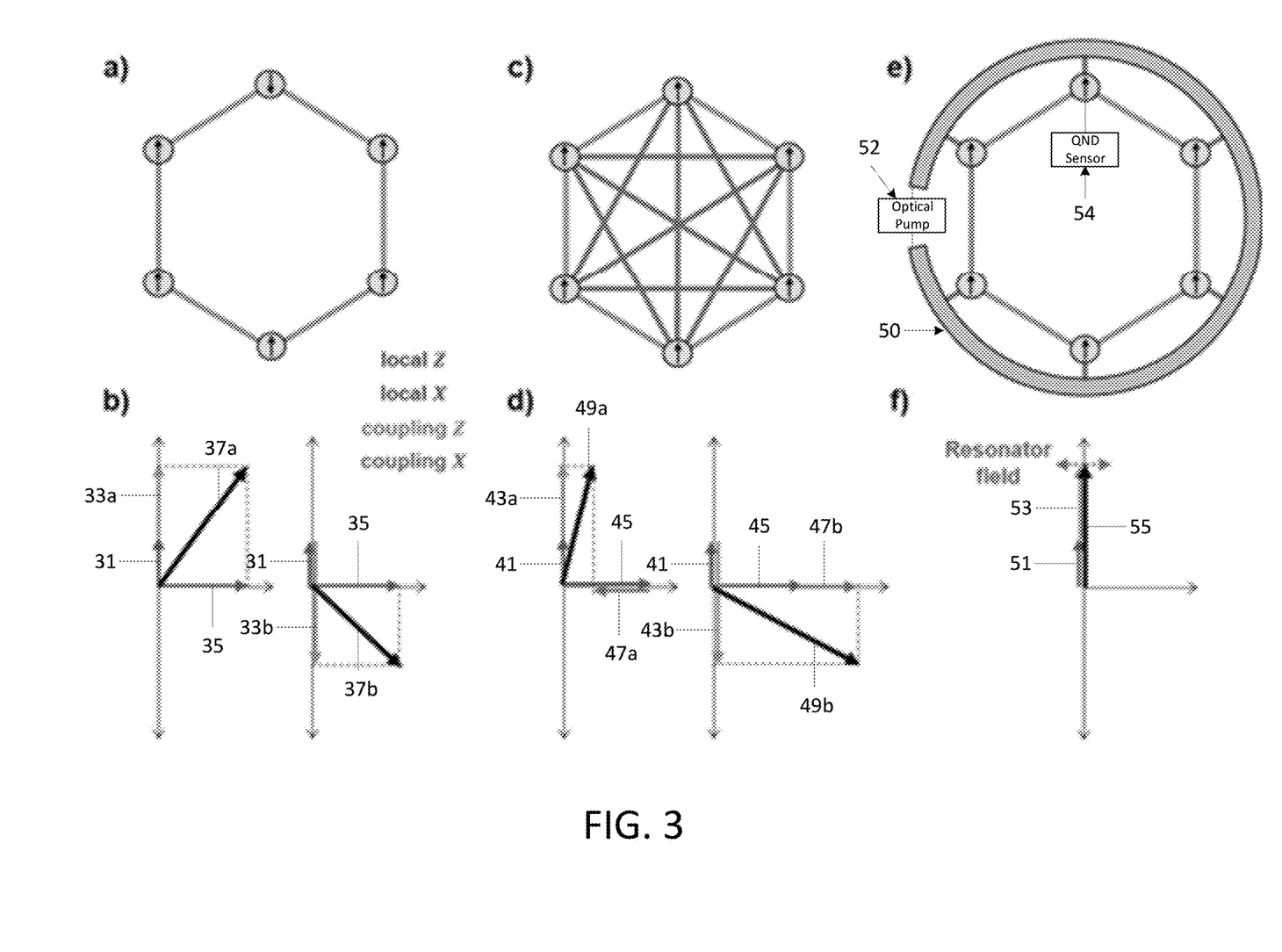
FIG. 3 shows a hardware comparison between DPA-QA and conventional quantum annealing, including a system for performing quantum annealing according to an embodiment.

FIG. 2 schematically shows a dressed-state picture of tunneling in DPA-QA. Drive photons at frequency ω separate the different manifolds, labelled with photon numbers N-2, N-1, N . . . above. Starting in an initial metastable state |m$_0$>, the system undergoes a multi-photon scattering process into a lower-energy state |m_>. Shown are two different, parallel paths 22 and 24 between these metastable states. The dressed levels most relevant for the process are highlighted in box 26. Due to virtual transitions between different photon number states of the drive, the energy barrier has been effectively suppressed.

A schematic comparison between implementation of DPA-QA and conventional QA is shown in FIGS. 3(a)-3(f) (collectively "FIG. 3"), for simple model system of six Ising spins connected in a closed loop. Of course, the use of six spins is merely illustrative to provide a concrete discussion, and other numbers of spins may be used in embodiments. Moreover, the coupling of these spins in a loop is also illustrative, and other configurations of couplings may be used in embodiments. These spins may be implemented, for example, using quantum bits ("qubits") as known in the art, or using other known technologies.

FIG. 3(a) illustrates the basic configuration of six spins in a loop. One of the spins is "down" (i.e. corresponds to a classical value of zero) while the other spins are "up" (corresponding to a classical value of one). These spin orientations are merely illustrative, and will vary as the system undergoes quantum annealing. For the case of conventional, transverse-field quantum annealing as shown in FIG. 3(b), each spin experiences a local Z field 31, an additional effective field 33a, 33b due to the Ising coupling with its neighbors, and a transverse driver field 35. These fields sum to produce the final fields 37a, 37b. As noted above, during the annealing schedule, the transverse field 35 starts strong, then diminishes in magnitude until it disappears. As may be appreciated by studying FIG. 3(b), the result of this process is that the field experienced by each spin gradually becomes less horizontal (i.e. in the "X" transverse direction) and more vertical (i.e. in the "Z" computational direction), until all spins are completely vertical (i.e. either up or down) and may be measured as the solution to the modeled optimization problem.

FIG. 3(c) illustrates a possible advanced hardware configuration incorporating non-stoquastic XX (or YY) interactions between spins. In this setup, each spin is Ising coupled not only to its two nearest neighbors as in FIG. 3(a), but also transversely to each other spin in the device. FIG. 3(d) shows the local Z field 41, the additional effective Ising fields 43a, 43b due to nearest-neighbor coupling, the transverse driver field 45, and the additional transverse coupling fields 47a, 47b that are then added to produce the total local fields 49a, 49b of each spin. In both the conventional TFQA shown in FIGS. 3(a) and 3(b), and the hypothetical system shown in FIGS. 3(c) and 3(d), the total local field for each spin is a spin-dependent, and state-dependent quantity whose direction and magnitude cannot be known in advance. However, dissipative, photon-assisted quantum annealing ("DPA-QA") embodiments of the present disclosure overcome these disadvantages, as now described.

Just as for multi-spin processes in conventional small-gap QA, coherence between the different paths through configuration space (from initial to final spin state as shown in FIG. 2) is necessary for non-trivial quantum advantage of DPA-QA. Unlike the conventional case, however, in DPA-QA these paths also contain virtual photon emission and absorption steps, which allow the total energy of the system to stay closer to its initial value during the tunneling process. A necessary precondition for constructive interference between tunneling paths is that the spontaneous photon emitted as a last step must be emitted into the same mode for all paths. In accordance with embodiments, this common mode is enabled by coupling all qubits transversely to a waveguide.

Thus, FIG. 3(e) shows a DPA-QA configuration in accordance with an embodiment of the concepts, techniques, and structures disclosed herein, where all spins are transversely coupled to a single microwave waveguide 50, which is pumped at one or more frequencies by an optical pump 52. As shown in FIG. 3(f), the total field 55 seen by each spin is formed by the local Z field 51 and the Ising coupling field 53. Crucially, and unlike the prior art, the total field 55 averages to zero along the transverse direction. One immediate advantage of this fact is that the field of each spin is now always in the computational direction, so it is possible to perform continuous quantum non-demolition (QND) measurement of the system using a QND sensor 54 as known in the art.

To maintain constructive interference, the relative microwave phase of the photons emitted by different qubits must be controlled. If qubits are spread out on the waveguide 50 over a distance that is comparable to or larger than the emission wavelength, any pairs of qubits that are close to a quarter-wavelength apart will emit independently (i.e. their photon-assisted tunneling amplitudes will not interfere) and any pairs close to a half-wavelength apart will actually experience destructive interference between their amplitudes. These effects must be carefully avoided once system become comparable to a drive wavelength in physical size. This may be achieved, for example, by placing qubits in groups separated by an integer number of drive wavelengths, or each qubit could each be coupled to two different locations on the waveguide 50. Thus, it is appreciated that FIG. 3(e), which shows each qubit coupled to a single location on the waveguide 50, is merely illustrative for expository purposes, and should not be viewed as limiting.

An important consequence of allowing the qubits to emit spontaneously into the waveguide 50 is that all intermediate states in multi-spin tunneling processes (i.e. states inside a barrier between local minima) also couple via spontaneous emission to nearby, lower-energy states differing by a single spin flip. Therefore, these intermediate states acquire a linewidth, which acts to disrupt the coherence between tunneling paths through configuration space by effectively "measuring" which path the system takes. Although this decoherence cannot be avoided in the scheme as presented, it can be suppressed by the optical pump 52 strongly driving the waveguide 50 in a mode having a number of photons N>>1.

There is a tradeoff here that must be mentioned. Since the overall tunneling rate will be proportional to the spontaneous emission rate into the waveguide 50, this rate cannot be made too small; on the other hand, the coupling strength to the system associated with the drive field cannot be so strong that it overwhelms the Ising energy scale. Therefore, in illustrative embodiments, the strength of the drive field and/or the strength of the coupling between qubits and waveguide will need to be adjusted to optimize performance. These quantities could be tuned empirically, or dynamically in a manner analogous to the annealing schedule in conventional QA.

Another important point is that these multi-photon inelastic scattering processes, as also shown in FIG. 1(c), are not restricted to lowering the system's energy. They can also produce tunneling to higher-energy local minima, since they can involve a net absorption of pump photons. Therefore, DPA-QA may be viewed as a way to induce tunneling, through many-spin energy barriers, that does not discriminate based on the energy of the state on either side of a given barrier.

One final note with regard to hardware implementation: as illustrated by FIG. 3(e), the spins in which the Ising problem is encoded are coupled transversely to the field of the waveguide (that is, via a transverse component of their dipole moment), in the absence of any local transverse fields. This is a configuration incompatible with flux qubits used in conventional quantum annealers, but may be implemented using Josephson phase-slip qubits, e.g. as described in U.S. Pat. No. 10,735,003.

To derive an effective optimization protocol from DPA-QA, one may use it iteratively, in a manner similar to what is done in conventional quantum annealers. That is, starting from a trial state, one allows dissipative evolution for a time, then measures to see if the energy has been lowered. If it has, evolution can continue; if not, the system can be classically reset to the trial state and the process repeated.

Figure 4:
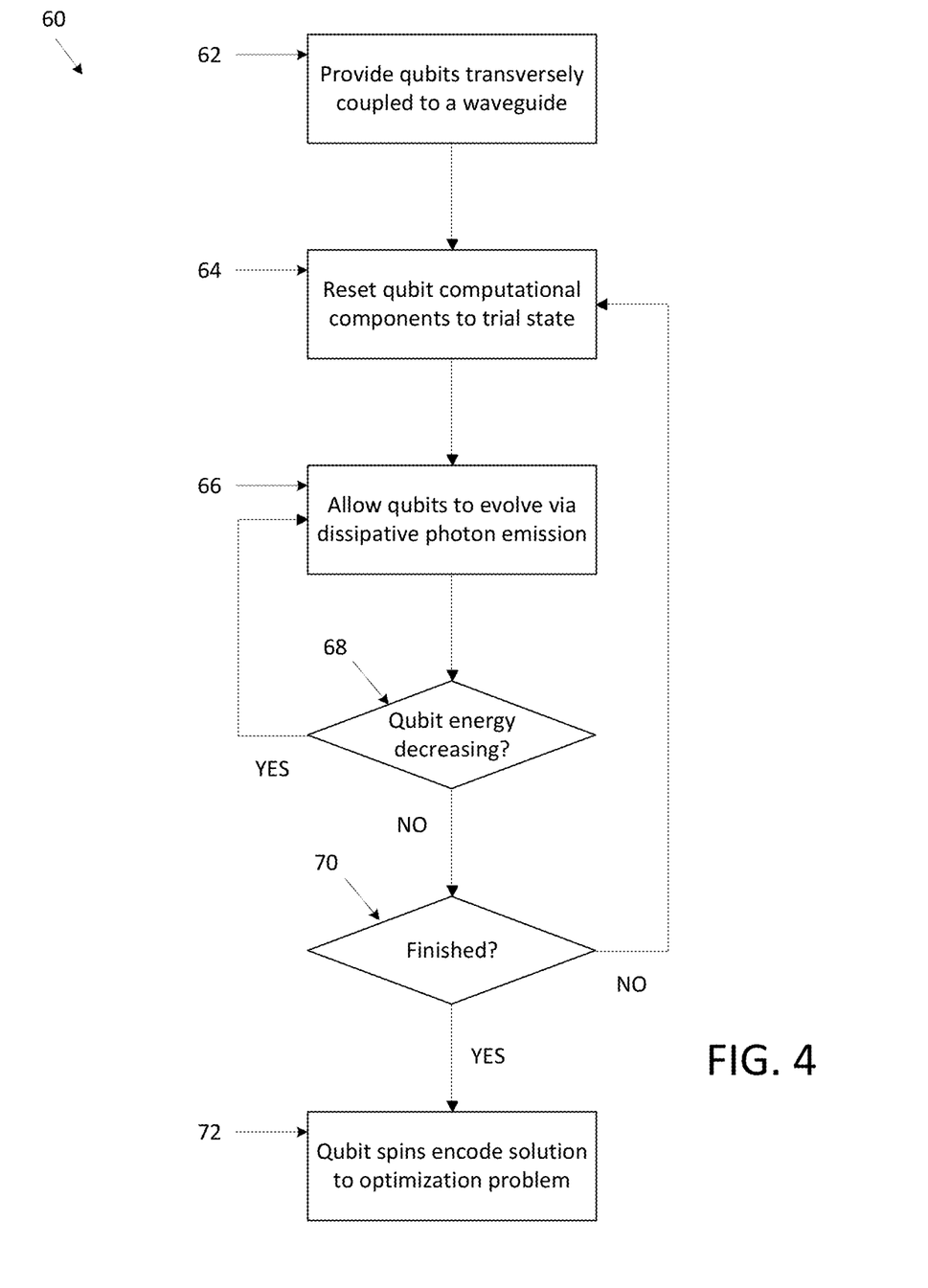
FIG. 4 shows a flowchart of a method of performing DPA-QA according to an embodiment.

Thus, FIG. 4 shows a flowchart of a method 60 of performing quantum annealing to solve a Boolean optimization problem according to an embodiment. The method 60 begins with a process 62 providing a plurality of qubits transversely coupled to a waveguide. That is, each qubit in the plurality having a spin that is coupled in a transverse direction to a magnetic field provided by a waveguide, such as waveguide 50.

Next, the method 60 includes a process 64 resetting components of the spins of the plurality of qubits in a computational direction to a trial state. The trial state may be a collection of qubit spins that heuristically approximate a solution to the optimization problem. Or the trial state may be determined through other means, including randomly.

Next, the method 60 includes a process 66 allowing the plurality of qubits to evolve via dissipative photon emission into the waveguide. Emission may be mediated by pumping the waveguide by an optical pump, such as optical pump 52, according to a frequency.

The process 66 is allowed to continue until a measurement process 68 determines that the energy of the qubits has stopped decreasing (i.e., the annealing schedule is complete). As noted above, the measurement process 68 may be a classical measurement of the energy, or comprise a quantum non-destructive (QND) measurement from a sensor such as QND sensor 54.

The method 60 continues to a process 70 that determines whether to finish overall annealing. This determination may be obtained, illustratively, when the system energy as measured by process 68 after the present annealing schedule is not substantially lower than the measurement after a prior annealing. If annealing should continue, the method 60 returns to process 64 to reset the qubit computational state. Otherwise, a process 72 concludes that a global minimum has been reached and the components of the qubit spins in the computational direction encode a solution to the optimization problem.

It may be possible to use measurement to continuously push the system to lower energies, obviating the need for the discrete, classical intervention just described for preventing the system from tunneling to higher-energy minima. This is possible since, unlike conventional QA known in the art, DPA-QA is compatible with continuous, weak QND measurement.

Embodiments of DPA-QA solve each of the problems with conventional QA as described above. Taking in turn each of the problems with conventional QA enumerated above, first DPA-QA is by definition non-stoquastic, as it is built on open-system quantum dynamics as opposed to quasi-statics (stoquasticity is defined only for static or quasi-static Hamiltonians). Also, in DPA-QA, multi-spin tunneling processes are enabled by a purely local coupling to a delocalized photon mode, or modes. This makes it much easier to implement than possible alternatives for direct, quasi-static, multi-spin fluctuations. Furthermore, the non-locality is almost certain to be much larger for DPA-QA than would be possible in any quasi-static implementation, since the virtual energy available from the pump in multi-photon processes effectively lowers all energy barriers by a large, extensive factor.

Second, by exploiting dissipative multi-photon scattering of a pump field, DPA-QA is designed to realize a broadband computational resource, which is not compressed into a few, exponentially-small, exponentially-sensitive parameter regions.

Third, DPA-QA uses high-frequency, multi-spin processes mediated by pump photon scattering, which exploit the energy available virtually from the pump field to tunnel through barriers. This both moves the noise sensitivity up to much higher frequencies where noise is vastly smaller, but also lowers all multi-spin tunneling barriers by an extensive factor.

Fourth, DPA-QA places no particular emphasis on the necessity of remaining in the ground state at all times, but is rather focused on generically enhancing the system's ability to tunnel through energy barriers in the configuration space.

Fifth, DPA-QA is an open-system protocol, where dissipation is both engineered and explicitly harnessed. This is much more appropriate for optimization problems than the "computational" approach of ground-state QA, in which all noise and dissipation must be removed.

And sixth, the effective quantum fluctuations at the center of DPA-QA are at relatively high frequencies, such that only the classical Ising Hamiltonian is present when viewed over quasi-static annealing timescales. From a low-frequency perspective, all of the spins therefore remain along the classical computational (Z) axis at all times (i.e. pointing either up or down). This means that the dominant decoherence source (low frequency Z noise arising from physical 1/f flux noise) commutes with the quasi-static Hamiltonian, and therefore does not induce transitions between computational states, vastly reducing its effect. Furthermore, since the axis of the total quasi-static field seen by the spins is now fixed along Z, QND measurement becomes possible throughout the protocol, opening the possibility for continuous monitoring and even quantum feedback.

In the foregoing detailed description, various features of embodiments are grouped together in one or more individual embodiments for the purpose of streamlining the disclosure. This method of disclosure is not to be interpreted as reflecting an intention that the claims require more features than are expressly recited therein. Rather, inventive aspects may lie in less than all features of each disclosed embodiment.

Having described implementations which serve to illustrate various concepts, structures, and techniques which are the subject of this disclosure, it will now become apparent to those of ordinary skill in the art that other implementations incorporating these concepts, structures, and techniques may be used. Accordingly, it is submitted that that scope of the patent should not be limited to the described implementations but rather should be limited only by the spirit and scope of the following claims.

What is claimed is:

1. A system for performing quantum annealing to solve an optimization problem, the system comprising:
    a plurality of qubits, each qubit in the plurality having an effective spin, wherein the spins of the plurality of qubits in a computational direction collectively encode the optimization problem;
    a waveguide coupling a transverse spin component of each qubit in the plurality of qubits, allowing spontaneous photon emission from the qubit into the waveguide; and
    an optical pump for pumping the waveguide according to a frequency.

2. The system according to claim 1, wherein the optical pump is configured to pump the waveguide coherently.

3. The system according to claim 1, wherein the optical pump is configured to pump the waveguide with drive photons, each drive photon having an energy that is an average local Zeeman energy of the spin of a qubit in the plurality of qubits.

4. The system according to claim 1, wherein a first qubit in the plurality of qubits and a second qubit in the plurality of qubits are physically separated by an integer multiple of wavelengths of photons pumped by the optical pump according to the frequency.

5. The system according to claim 1, wherein a qubit in the plurality of qubits is coupled to two different locations on the waveguide.

6. The system according to claim 1, further comprising a sensor for performing a quantum non-demolition measurement, in the computational direction, of the spin of one of the qubits in the plurality of qubits.

7. The system according to claim 6, wherein the sensor is configured for continuous measurement in the computational direction.

8. A method of performing quantum annealing to solve an optimization problem, the method comprising:
    (a) providing a plurality of qubits, each qubit in the plurality of qubits having a spin that is coupled in a transverse direction to a magnetic field provided by a waveguide;
    (b) resetting components of the spins of the plurality of qubits in a computational direction to a trial state;
    (c) allowing the plurality of qubits to evolve via dissipative photon emission into the waveguide while energy of the plurality of qubits is decreasing;
    (d) when the energy of the plurality of qubits has stopped decreasing but has not reached a global minimum, returning to step (b); and
    (e) when the energy of the plurality of qubits has reached the global minimum, measuring the components of the qubit spins in the computational direction, wherein the measured components encode a solution to the optimization problem.

9. The method according to claim 8, further comprising pumping the waveguide by an optical pump according to a frequency.

10. The method according to claim 9, wherein pumping the waveguide comprises pumping with drive photons, each drive photon having an energy that is an average local Zeeman energy of the spin of a qubit in the plurality of qubits.

11. The method according to claim 8, further comprising performing continuous, quantum non-demolition measuring in the computational direction of the spin of one of the qubits in the plurality of qubits.

* * * * *